Figure 1:
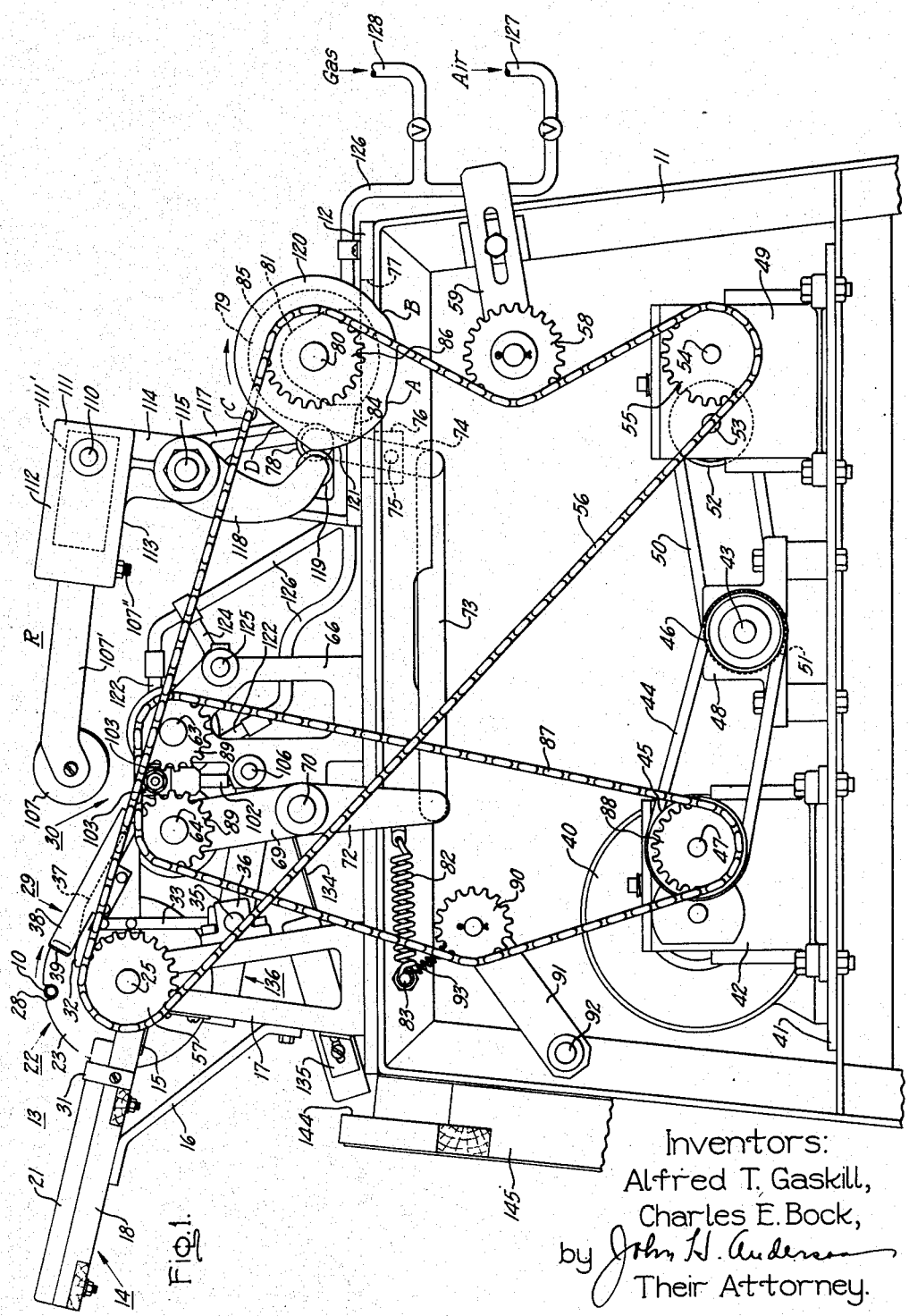

Fig. 2.

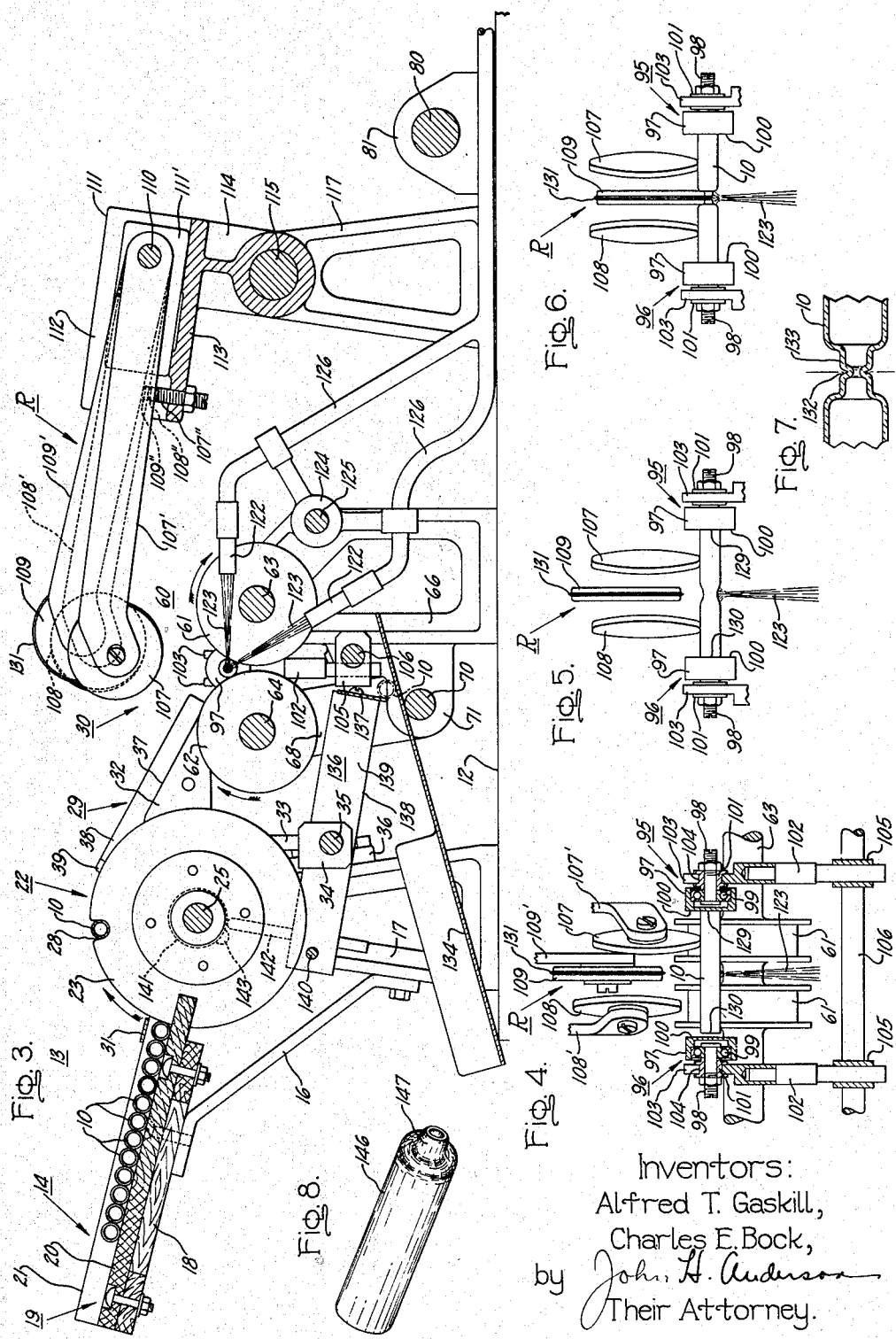
Inventors:
Alfred T. Gaskill,
Charles E. Bock,
by John H. Anderson
Their Attorney.

Patented Sept. 19, 1950

2,523,006

UNITED STATES PATENT OFFICE 2,523,006

GLASS TUBE RESHAPING APPARATUS

Alfred T. Gaskill, Cleveland Heights, and Charles E. Bock, Cleveland, Ohio, assignors to General Electric Company, a corporation of New York Application January 3, 1944, Serial No. 516,750

11 Claims. (Cl. 49—7)

Our invention relates, in general, to apparatus for reshaping glass tubing and then severing it to form individual blanks. More particularly, our invention relates to apparatus for automatically forming glass bulbs or blanks for electrical devices such as electron discharge devices, lamps, etc.

The manufacture of certain types of radio tubes requires the use of a small cylindrical glass bulb or envelope of determinate length and having a short tubular protuberance or nipple projecting therefrom (preferably concentrically from an end thereof) for permitting tubulation of the bulb for exhaust purposes.

Another object of our invention is to provide apparatus for automatically producing, at a high rate of speed, glass bulbs of the above mentioned character.

Further objects and advantages of our invention will appear from the following description of a species thereof and from the accompanying drawings in which:

Fig. 1 is a side elevation of apparatus comprising our invention; Fig. 2 is a plan view of the apparatus shown in Fig. 1; Fig. 3 is a longitudinal vertical section taken on the line 3—3 of Fig. 2; Fig. 4 is an elevation, partly in section, through one of the roller cradles of the apparatus comprising our invention and showing the pressure and forming rollers in their first operative position; Figs. 5 and 6 are elevations corresponding to Fig. 4 but showing the pressure and forming rollers in their second and third operative positions, respectively; Fig. 7 is an enlarged fragmentary section of the reshaped portion of the glass tube; and Fig. 8 is a perspective view of one of the finished glass articles or bulbs produced by the apparatus comprising our invention.

In accordance with the invention, definite lengths or blanks 10 of glass tubing are first heated at the midpoint thereof, then stretched to an exact predetermined length, then necked at the heated mid-section thereof and a sharp annular indentation formed in the necked portion to provide a predominant line of weakness in the tube, and finally severed at the indentation, as by subjecting the tube to a mechanical shock, to thereby divide the tube into a pair of identical glass bulbs each provided with a nipple at one end thereof.

Referring to the drawings, the machine comprising our invention is preferably of the multiple type for simultaneously processing a plurality (preferably 3) of the tubular glass blanks 10. As shown in the drawings, the said machine comprises a stand 11 preferably fabricated of T-iron and having a flat table or bed plate 12 extending across and fastened to the top thereof.

Mounted on the table 12 adjacent one end thereof is a blank feeding mechanism 13 for feeding the tubular glass blanks 10 to the processing mechanism of the machine. The said feeding mechanism 13 comprises an inclined feeder tray 14 suitably secured, as by angles 15 and braces 16, to a pair of upstanding spaced brackets 17 mounted on the table 12. The said feeder tray 14 comprises a rectangular frame 18 preferably made of hardwood strips and provided with three separate and parallel storage chutes or guideways 19 each arranged to hold a line of the tubular glass blanks 10 to be processed. Each of the said chutes or guideways 19 comprises a bottom 20, preferably in the form of a strip of hardwood, and a pair of parallel metal side strips or flanges 21 fastened to and projecting upwardly from the chute bottom 20 a sufficient distance to retain the line of glass blanks 10 in the chute. The parallel sides 21 of each chute are spaced apart a distance slightly greater than the length of the glass blanks 10 so as to permit free sliding or rolling movement of the tubular glass blanks 10 down the chute.

Disposed opposite the discharge end of each chute 19 and in line therewith is a rotating feed selector device 22 for picking up the tubular glass blanks 10 one at a time from the line of blanks in the chute and feeding them to the reshaping mechanism of the machine. The said feed selector 22 comprises a pair of hubbed feed discs 23 (one pair for each chute 19) which are rotatively locked, as by set screws, on a common horizontal shaft 25 extending transversely of the chutes and journaled at its opposite ends in bearings 26 in the brackets 17. The two feed discs 23 of each pair extend a short distance into the discharge end of the associated chute 19 for which purpose the bottom 20 of the chute is suitably notched, as indicated at 27 in Fig. 2, to accommodate the two spaced discs 23 between the chute sides 21. The line of glass blanks 10 in each chute 19 thus rests against the peripheries of the associated pair of feed discs 23, and each pair of feed discs 23 is provided with aligned notches 28 in their respective peripheries for receiving one of the tubular glass blanks 10 therein.

The feed selector shaft 25 and the feed discs 23 mounted thereon are slowly rotated in the direction indicated by the arrow in Fig. 1 by suitable means hereinafter described. Each time the aligned notches 28 in each pair of feed discs 23 comes opposite the lower end of the line of glass blanks 10 in the associated chute 19 during the rotation of the said discs, the lowermost glass tube or blank 10 drops or rolls into the said aligned notches 28 and is then carried up and around by the discs 23 to the other side of the discs where it is picked up and drawn out of the disc notches 28 by a downwardly inclined track or runway 29 down which the glass tube 10 then rolls to the reshaping mechanism 30 of the machine. To prevent bunching or piling up of the glass blanks 10 at the lower end of the chute 19, a condition which might otherwise cause the feed selector discs 23 to pick up more than one of the glass blanks at a time, a guide strip or bar 31 is mounted on the feeder tray 14 to extend transversely across the chutes 19 and above the same at a point immediately adjacent the peripheries of the feed discs 23. The said guide bar 31 thus permits only one glass tube or blank 10 at a time to rest against the peripheries of the two feed discs 23 and to be picked up and fed by the said discs to the reshaping mechanism 30.

The runways 29 each comprise a pair of vertically arranged plate-shaped runners 32 each secured by an upright post 33 and a support block 34 to a horizontal rod 35 extending transversely of the machine and fastened at its opposite ends to the spaced brackets 17 by suitable mounting brackets 36. The upper edges 37 of the runners 32 are inclined downwardly away from the feed discs 23, and each pair of the said runners 32 are disposed on the opposite outer sides of the associated pair of feed discs 23 in sufficiently close and overlapping relation thereto to engage the projecting opposite end portions of the glass blank 10 in the feed disc notches 28 when the said blank is carried around to the runway 29 by the rotating feed discs 23. The continued rotation of the feed discs 23 following such engagement of the glass blank 10 with the downwardly inclined upper edges 37 of the runners 32, thus causes the glass blank 10 to be drawn completely out of the feed disc notches 28, whereupon the glass blank 10 is then free to roll down the runners 32 to the reshaping mechanism 30 of the machine. To guide the blanks 10 laterally within the runways 29 as they roll down the same to the reshaping mechanism 30, each runway is provided with a pair of vertically extending parallel side or guide flanges 38 between which the glass blanks 10 extend. The two guide flanges 38 of each runway are suitably secured, as by riveting, to the runner plates 32 and the front ends of the said flanges (i. e., the ends adjacent the feed discs 23) are flared outwardly away from one another, as indicated at 39 in Fig. 2, to thereby guide the tubular blanks 10 into and between the parallel extending portions of the said guide flanges 38.

As shown in Figs. 1 and 2, the means for rotating the feed selector discs 23 comprises an electric motor 40 mounted below the table 12 of the machine on a shelf portion 41 of the machine stand 11. The motor 40 is coupled to a speed reducer 42 likewise mounted on the shelf 41 and suitably connected to a countershaft 43, as by a V-belt 44 and co-operating V-pulleys 45, 46 on the speed reducer shaft 47 and countershaft 43, respectively. The countershaft 43, which is journaled in bearings 48 mounted on the shelf 41, is in turn suitably connected to a second speed reducer 49 mounted on the shelf 41, as by a V-belt 50 and co-operating pulleys 51, 52 on the countershaft 43 and speed reducer shaft 53, respectively. The low-speed shaft 54 of the speed reducer 49 is provided with a sprocket 55 which is connected by a drive chain 56 to a sprocket 57 on the feed selector shaft 25 to thereby complete the drive for the said feed selector shaft and the feed discs 23 thereon. Suitable means may be provided for tightening the chain 56, such as a sprocket 58 engaging the said chain and rotatably mounted on a support arm 59 adjustably fastened to the machine stand 11.

Disposed opposite the discharge end of each runway 29 and in alignment therewith is a roller cradle 60 formed of a plurality (preferably two) of opposed pairs or sets of rotatable rollers 61, 62 for supporting and rotating the glass blanks 10 about their longitudinal axes during the reshaping thereof. As shown in Fig. 2, the said rollers 61, 62 are disposed with their peripheries close together so that the upper, converging arcs of the several rollers form a cradle notch within which the glass blanks 10 are received and supported, the blanks being directed into the cradle notch of each roller cradle 60 by the associated runway 29. The peripheries of rollers 62 are preferably annularly grooved or notched as indicated at 62', but rollers 61 are preferably formed with plain cylindrical peripheries to prevent angling or improper positioning of the glass blanks 10 in the roller cradles 60.

The rollers 61, 62 of the several roller cradles 60 are mounted on parallel, horizontal shafts 63 and 64, respectively, which extend transversely and are spaced longitudinally of the machine, the rollers preferably being formed integral with the said shafts so as to rotate as a unit therewith. Roller shaft 63 is journaled at its opposite ends in bearings 65 on a pair of laterally-spaced upstanding roller-support brackets 66 mounted on the machine table 12. The other roller shaft 64 is journaled at its opposite ends in bearings 67 on a pair of laterally-spaced levers 68, 69. The said levers 68, 69 are pivotally mounted on and keyed to a transversely extending, horizontal pivot shaft 70 journaled in bearings 71 on the roller-support brackets 66. Lever 69 is provided with an extension or arm 72 which is connected by a link 73 to one arm of a roller-type cam follower lever 74 located adjacent the rear of the machine and pivotally mounted at an intermediate point thereof on a pin 75 disposed beneath the table 12 and supported therefrom by a bracket 76. The other arm of the cam follower lever 74 projects upwardly through a slot 77 (Fig. 2) in the table 12 and is provided with a roller 78 which engages and rides on the periphery of a rotating disc cam 79 mounted on a horizontal cam shaft 80 extending transversely of the machine at the rear end thereof and journaled in bearings 81 on the table 12. The roller 78 of the cam follower lever 74 is continuously held against the cam 79 by the action of a tension coil spring 82 connected at one end to the arm 72 of roller support lever 69 and at the other end to a stud 83 fastened to and projecting from the machine stand 11.

The cam 79, through the medium of the follower lever 74, link 73, roller-support levers 68, 69 and the spring 82, moves the blank-supporting rollers 62 of the several roller cradles 60 alternately away from and back to their normal blank-supporting position closely adjacent the other rollers 61 of the roller cradles, the cam 79 being so shaped as to move the rollers 62 away from the other rollers 61 once, for only a short instant, during each revolution of the cam 79, and for a distance sufficient to allow the glass blanks 10 supported in the roller cradles 60 to drop between the separated sets of rollers 61, 62 and thus out of the said cradles. The separating movement of the rollers 62 is produced by the hump or elevated portion 84 on the peripheral cam surface of the cam 79, and the remaining or idle portion 85 of the cam surface determines the normal or blank-supporting position of the rollers 62.

The cam shaft 80 is driven by the same chain 56 that drives the feed roll shaft 25 so that the said shafts rotate in timed interrelation, the cam shaft 80 having a sprocket 86 thereon which is engaged by the drive chain 56. The said sprocket 86 is of the same pitch diameter as that of the sprocket 57 on the feed roll shaft 25 whereby the cam shaft 80 makes one complete revolution for each revolution of the feed roll shaft 25.

During the operation of the machine, the blank-supporting rollers 61, 62 are continuously rotated all in the same direction, as indicated by the arrows in Fig. 3 to thereby impart rotation to the glass blanks 10 supported in the several roller cradles 60. The said rollers 61, 62 are driven from the shaft 47 of the first speed reducer 42 by means of a chain 87 which connects a sprocket 88 on the speed reducer shaft 47 with two identical sprockets 89, 89, on the two roller shafts 63, 64. To maintain proper tension on the roller drive chain 87 and to allow for the separating movement of roller shaft 64 from the other roller shaft 63 during the operation of the machine, suitable resilient tensioning means are provided therefor in the form of a sprocket 90 engaging the said chain 87 and rotatably mounted on one end of an arm 91 which is pivotally mounted at its other end on a pin 92 projecting from the machine stand 11. A tension coil spring 93, connected at one end to the arm 91 and at its other end to the stud 83 on the machine stand 11, acts to maintain substantially constant tension in the chain 87.

The glass blanks 10 are directed by each runway 29 into the cradle notch of the associated roller cradle 60 and in a position between a pair of opposed anti-friction end stops or abutments 95, 96 against which the opposite ends of the glass blanks 10 are adapted to abut during the reshaping operation. The two end stops 95, 96 together act as a length-gauge for determining the exact length to which the glass blanks 10 are to be stretched during the reshaping operation, the length-gauge thus insuring a uniform final overall length for the reshaped individual glass blanks. Preferably, the end stops 95, 96 are spaced apart a distance only slightly greater (in the particular instance shown approximately $\frac{3}{32}$ of an inch greater) than the average length of the blanks 10 to be processed.

As shown in Fig. 4, the said end stops 95, 96 each comprise a cup-shaped button 97 rotatably mounted on a pin 98 to rotate about an axis parallel to and substantially coinciding with the axis of rotation of the glass blanks 10 when supported in the associated roller cradle 60. The button 97 is supported on the pin 98 by a roller bearing 99 so as to be freely rotatable thereon. The said button 97 has a flat end wall 100 at least the exposed blank-engaging surface of which is of a sufficiently wear-resisting character, for instance case-hardened, to withstand any and all wearing action incident to the engagement of the said surface with the ends of the rotating glass blank 10 in the roller cradle 60. The gauge button support pin 98 is mounted in a collar 101 carried by an upright post 102, the said post being forked at its upper end to provide two vertical arms 103 which slidably fit more or less tightly into an annular groove 104 in the periphery of the collar 101 to thereby provide the support for the collar. The gauge button support post 102 is fastened at its lower end to a bracket 105 adjustably mounted on a cross rod 106, the post being vertically adjustable in the said bracket 105 so as to enable the setting of the rotatable button 97 at the proper height to align its axis of rotation with that of the glass blanks 10 when supported in the associated roller cradle 60. The cross rod 106 is supported at its opposite ends in the roller support brackets 66, and the post support bracket 105 is adjustable longitudinally of the cross rod 106 so as to enable setting of the two opposed end stops 95, 96 the desired distance apart and in aligned relation with the associated runway 29 and with the other parts of the reshaping mechanism 30 of the machine.

Disposed above each roller cradle 60 so as to overlie the glass blanks 10 when supported therein is a group of three laterally-spaced rollers comprising two oppositely-canted pressure rollers 107 and 108 arranged on opposite sides of a central, forming roller 109. The three rollers 107, 108, and 109 are rotatably mounted on the forward ends of three separate support or lever arms 107', 108', and 109', respectively, which extend rearwardly from the said rollers. The forming roller 109 is rotatably mounted on its lever arm 109' to rotate about an axis parallel to the axis of rotation of the glass blank 10 in the roller cradle 60. The two pressure rollers 107 and 108, however, are rotatably mounted on their respective lever arms 107' and 108' to rotate about axes canted in opposite directions with respect to the axis of rotation of the glass blank 10 in the roller cradle 60 whereby the said rollers 107, 108 exert oppositely directed forces or endwise thrusts on the glass blank tending to stretch it or pull it apart when the said rollers are in rolling contact with the blank. Obviously, to exert such stretching or elongating thrusts on the glass blank 10, the angles of inclination or cant of each of the two rollers 107, 108 must be in such directions in relation to the direction of rotation of the glass blank 10 in the roller cradle 60 as to cause each of the said rollers to exert an endwise thrust on the glass blank tending to move it endwise into abutting engagement with the corresponding adjacent end stop 95 or 96 when the said roller is in rolling engagement with the glass blank.

In accordance with the invention, one of the pressure rollers 107, 108 is canted at an angle slightly greater than the angle of cant of the other of said rollers so as to exert an endwise thrust on the glass blank 10 slightly greater than that exerted by the said other roller. Thus, in the particular case shown, the roller 107 (hereinafter referred to as the blank-positioning roller) is preferably canted at an angle of 10° or thereabouts while the other roller 108 (hereinafter referred to as the blank-stretching roller) is canted at a slightly smaller angle of preferably 7° or thereabouts.

The three roller support or lever arms 107', 108' and 109' are pivotally mounted at their rear ends on a common horizontal pivot pin 110 extending transversely of the machine and supported, at its opposite ends, in the mid-region of an inverted L-shaped carrier bracket or block 111. The three support arms 107′, 108′ and 109′ are maintained in proper spaced position on the pivot pin 110 by means of spacer blocks 111′ interposed between the said support arms. One arm 112 of the carrier bracket 111 extends forwardly and is formed with a wall portion 113 which underlies the three lever arms 107′, 108′ and 109′. The said wall portion 113 of the carrier bracket 111 is provided with three adjustment or set screws 107″, 108″ and 109″ (one for each of the lever arms 107′, 108′ and 109′) which are threaded up through the wall 113 in line with the said lever arms to form stops against which the lever arms rest to thereby fix the relative elevation of the three rollers 107, 108 and 109 with respect to one another when in their raised, inoperative position. As shown in Fig. 3, the three set screws 107″, 108″ and 109″ are so adjusted as to vertically separate the three rollers 107, 108 and 109 a slight distance apart relative to one another when in their raised inoperative position, with the blank-positioning roller 107 lowermost and the blank-forming roller 109 uppermost. The other arm 114 of the carrier bracket 111 extends downwardly and is keyed to a cross shaft 115 journaled at its opposite ends in bearings 116 on laterally-spaced upstanding support brackets 117 fastened to the machine table 12.

The three carrier brackets 111 (there being a separate bracket 111 for each of the three groups of rollers 107, 108 and 109) are all keyed to the cross shaft 115, and the said shaft is provided with a depending cam follower arm 118 keyed to one end of the shaft and having a roller 119 at its lower end which engages and rides on the periphery of a cam 120 mounted on the cam shaft 80. As shown in Fig. 1, the periphery of the said cam 120 is provided with three drops or falls A, B and C located at spaced intervals therearound for lowering each roller assembly R, comprising the three rollers 107, 108 and 109, successively to three different operative positions, i. e., a blank-positioning position, a blank-stretching position and a blank-forming position. The first drop A of the cam 120 lowers each roller assembly sufficiently (e. g., to its first or blank-positioning position) to allow only the lowermost or blank-positioning roller 107 thereof to engage and rest of its own weight on the glass blank 10 in the associated cradle 60, as shown in Fig. 4. The second drop B of the cam 120 lowers each roller assembly R a further amount (e. g., to its second or blank-stretching position) sufficient to allow the second or blank-stretching roller 108 to also engage and rest of its own weight on the glass blank 10 along with the blank-positioning roller 107, as shown in Fig. 5. The third drop C of the cam 120 then lowers each roller assembly R a still further amount (e. g., to its third or blank-forming position) sufficient to allow the third or blank-forming roller 109 to engage the glass blank 10 along with the two other rollers 107 and 108, as shown in Fig. 6. The subsequent rise D of the cam 120 then lifts the roller assembly R to its raised, inoperative position, in which position it is then held by the maximally elevated portion 121 of the cam to allow the entry of a glass blank 10 into the cradle notch of the associated roller cradle 60.

Disposed adjacent and projecting forwardly between the two rollers 61 of each roller cradle 60 is a pair of continuously operating burners 122, 122 for directing pointed gas fires 123 against the peripheral surface of the rotating glass blank 10 in the roller cradle, the said burners being so arranged as to heat the blank 10 at a region substantially midway between the two opposed end stops 95, 96. Each pair of burners 122, 122 is supported on a separate burner holder bracket 124, the several holder brackets 124 being mounted, in turn, on a common cross rod 125 supported at its opposite ends in the roller support brackets 66. The burners 122 are connected by pipes 126 to a source of a suitable gaseous combustion admixture such as gas and air, the pipes 126 connecting with other pipes 127 and 128 which are connected, respectively, to sources of air and gas supply (not shown).

The rotative position of the feed discs 23 on their common support shaft 25 is so related with the rotative positions of the actuating cams 79 and 120 on the cam shaft 80 as to deliver the glass blanks 10 to the roller cradles 60 during the interval when the roller assemblies R are held in their raised, inoperative position (by reason of the engagement of the roller 119 of cam follower arm 118 with the maximally elevated portion 121 of the said cam 120) and just after the displaceable rollers 62 of the roller cradles have been returned to their normal blank-supporting position by reason of the action of the spring 82 on lever 69 in causing the roller 78 of cam follower lever 74 to ride down the hump 84 on cam 79.

As soon as a glass blank 10 has been delivered to each roller cradle 60 and is supported in position on the rotating rollers 61, 62 thereof, the roller assembly R drops to its first operative position (by virtue of the cam follower roller 119 riding down the drop A of cam 120) to thereby permit the blank-positioning roller 107 having the greater cant to engage and rest of its own weight on the right-hand portion (Fig. 4) of the rotating glass blank 10, as a result of which the said roller rotates along with the glass blank and, because of its canted disposition, exerts an end thrust on the blank serving to move the latter endwise in the roller cradle (to the right as viewed in Fig. 4) into abutting engagement with the end stop 95. In this manner, the blank 10 is positioned and continuously held in the roller cradle 60 with the right end 129 thereof (i. e., the end in engagement with the stop 95) located in a predetermined position transversely of the forming roller 109.

Meanwhile, the gas fires 123 continuously heat the positioned blank 10 at a region substantially midway between the opposed end stops 95, 96. After the rotating glass blank 10 has been thus heated for a period of time sufficient for the glass to become plastic (preferably about two seconds or so in the case of a soft glass tube of the proportions shown), the roller assembly R then drops to its second or blank-stretching position (by reason of the cam follower roller 119 riding down the drop B of cam 120) so as to permit the blankstretching roller 108 of the lesser cant to engage and rest of its own weight on the left-hand portion of the rotating blank 10, the companion roller 107 meanwhile maintaining its rolling contact with the right-hand portion of the blank. The resulting effect of the concomitant engagement of the two oppositely-canted rollers 107, 108 with the rotating glass blank 10, at points on opposite sides of the heated and plastic center portion thereof, is to impress two opposed end thrusts or forces on the glass blanks directed away from one another which tend to separate the two halves of the blank so as to stretch or elongate the latter at the plastic midsection thereof, the roller 107 maintaining the right-hand portion of the blank against the end stop 95 and the roller 108 moving the left-hand portion of the blank endwise to the left until the left end 130 of the blank abuts against the other end stop 96, as shown in Fig. 5. The constant maintenance of the right-hand portion of the blank 10 against the end stop 95 during the entire blank-stretching operation is assured by the greater angle of inclination or cant of roller 107 as compared with roller 108; the roller 107, because of its greater cant, accordingly exerting a rightwardly directed end thrust of greater magnitude than the leftwardly directed end thrust exerted by the companion roller 108. The maintenance of the right-hand half of the glass blank 10 against the end stop 95 by the roller 107 during the blank-stretching operation assures that the stretching of the individual glass blanks 10 will uniformly occur in the same manner and at the same point longitudinally thereof, and also that the blanks will be uniformly stretched to the same predetermined length as determined by the separation of the length-gauge end stops 95—96.

After the two oppositely-canted rollers 107, 108 of each roller assembly R have been in rolling contact with the rotating glass blank 10 for a period of time at least sufficient to insure the stretching of the blank to the full distance between the end stops 95, 96 (in the particular case a period of eight seconds or thereabouts), the roller assembly R then drops to its lowermost or blank-forming position, by reason of the cam follower roller 119 riding down the drop C of cam 120, to thereby permit the forming roller 109 to engage the heated and plastic center portion of the rotating glass blank (Fig. 6) and neck the latter, at the exact center thereof, to a predetermined extent as determined by the setting of the co-operating stop 109'' on the carrier bracket 111. Upon engagement with the heated and plastic center portion of the glass blank, the roller 109, resting of its own weight on the said blank portion, presses the plastic glass inwardly until the roller support arm 109' abuts and rests against the upper end of the underlying stop 109'' to thereby limit the extent of indentation or necking of the glass blank. The peripheral blank-engaging face of the forming roller 109 may be of any suitable shape, but for the purpose of the present invention is preferably of cylindrical form and provided with an annular ridge 131, preferably of pointed or wedge shape, located centrally of the roller face. The ridge 131 thus forms a more or less sharp indentation or V-shaped groove 132 (Fig. 7) in the center of the necked portion 133 of the glass tube serving to produce a predominant line of weakness in the tube (as indicated by the dash-dot line in Fig. 7) along which line the tube will readily crack or break when it is subjected to a mechanical shock or blow of proper character.

The engagement of the forming roller 109 with the blank 10 to perform the necking thereof preferably continues for only a relatively short period of time, such as ½ second or thereabouts, after which the roller assembly R is raised to its normal, elevated position by reason of the roller 119 on cam follower arm 118 riding up the rise D of cam 120 to the maximally elevated portion 121 thereof. With the roller assembly R held in such elevated position, the rollers 62 of each roller cradle 60 then separate from the other rollers 61 thereof (by reason of the engagement of roller 78 on cam follower lever 74 with the hump 84 on cam 79) to thereby permit the reshaped glass blanks 10 to drop between the separated rollers 61, 62 and down onto a forwardly extending slide 134 fastened at its forward end to the upstanding brackets 17 by angles 135 and resting at its rear end on the pivot shaft 70 for the roller support levers 68, 69.

Upon dropping onto the slide 134, the blanks 10 are temporarily held from rolling or sliding down the same, for a period sufficient to enable the blanks to cool, by a pivotal gate mechanism 136 operated in timed relation with the separating movement of the blank-supporting rollers 62. The said gate mechanism 136 comprises a retaining or gate bar 137 extending transversely across the slide 134 immediately above the same and against which the blanks 10 rest during the holding or cooling period, as shown in dotted lines in Fig. 3. The retaining bar 137 forms one side of a rectangular frame 138 having as its other members a pair of forwardly extending end bars 139 and a front tie rod 140. The said frame 138 is pivotally mounted on the transversely extending runner support rod 35 to permit vertical rocking movement of the frame, and the portion of the frame extending rearwardly of the pivot rod 35 over-balances the portion of the frame extending forwardly of said rod whereby the retaining bar 137 at the rear of the frame normally rests in its lowered blank-retaining position, as shown in Fig. 3.

After the blanks 10 have been retained by the retaining bar 137 for a period sufficient to enable the blanks to cool, the frame 138 is rocked to lift the retaining bar 137 away from the slide 134 and permit the blanks 10 to slide or roll down the said slide. The rocking of the frame 138 is produced by a disc cam 141 (Figs. 2 and 3) mounted on the feed disc shaft 25, the frame 138 having a follower pin 142 projecting up from the forward portion of one of the frame end bars 139 and engaging with the periphery of the cam 141. The retaining bar 137 of the frame 138 is held in its raised, blank-releasing position for only a brief instant sufficient to enable the escape of the blanks 10 down the slide 134, the cam 141 for such purpose being provided with a small protuberance 143 on its peripheral cam surface. The rotative position of the frame actuating cam 141 on its support shaft 25 is preferably so related with the rotative position of the roller cradle roll-separating cam 79 on the cam shaft 80 as to raise the blank-retaining bar 137 to release the blanks 10 down the slide 134, and to return to its normal blank-retaining position, just before the cam 79 separates the rollers 62 of the roller cradles from the other rollers 61 thereof to allow the next group of blanks 10 to drop from the roller cradles onto the slide 134.

Upon being released by the retaining bar 137, the blanks 10 slide or roll down the slide 134 and strike against the upwardly extending far side 144 of, and drop into, a transversely arranged chute 145 which is fastened to the front of the machine stand 11 and delivers the blanks into a suitable storage hamper or to other receiving means. The impact of the glass blanks 10 against the chute side 144 breaks or severs the blanks in two at the notch 132 in the necked midsection 133 thereof to thereby form two individual and exactly alike bulb blanks 146 of the shape shown in Fig. 8, each bulb blank 146 hav-

What we claim as new and desire to secure by Letters Patent of the United States is:

1. In apparatus of the character described, a roller assembly comprising a pair of oppositely canted rollers arranged to rest and roll on opposite sides of a heated portion of a horizontally supported rotating glass tube, said rollers having different degrees of cant, separate support arms for each of said rollers, a pivotal bracket on which the support arms are pivotally mounted, stop means on said bracket for normally supporting said arms in fixed positions above said tube, and cam means for pivoting said bracket to lower into engagement with the tube first the roller having the greater cant and then the roller having the lesser cant.

2. In apparatus of the character described, a roller assembly comprising a pair of oppositely canted rollers arranged to rest and roll on opposite sides of a heated portion of a horizontally supported rotating glass tube, a forming roller arranged to rest and roll on the heated portion of the tube, separate support arms for each of said rollers, a pivotal bracket having a shaft on which said arms are pivotally mounted, stop means on said bracket for supporting the forming roller in a position elevated with respect to the canted rollers, and cam means for pivoting said bracket to first lower the canted rollers into rolling engagement with the rotating tube and to subsequently lower the forming roller into rolling engagement with the heated portion of the tube until the tube is formed to a predetermined shape.

3. Apparatus for forming articles from a glass tube comprising means for supporting the tube, means for heating an intermediate portion of the tube, means for annularly indenting the heated portion of the tube to form a predominant line of weakness therein, a slide adjacent said support means for receiving the heated and formed tube from the support means, means for effecting delivery of the tube from said supporting means to said slide, means for temporarily holding said tube at the upper end of said slide while the heated portion thereof cools and for subsequently releasing the tube so it slides therealong and a striker member arranged adjacent the lower end of the slide to impart a mechanical shock to the cooled tube serving to sever the tube at the said line of weakness.

4. Apparatus for forming articles from a glass tube comprising means for supporting the tube horizontally, means for heating an intermediate portion of the tube, means for annularly indenting the heated portion of the tube to form a predominant line of weakness therein, a slide for receiving the heated and formed tube from the support means in a position to roll down said slide, means for effecting transfer of the tube from said support means to said slide a gate for temporarily holding the formed tube from rolling down the slide until the heated portion of the tube cools, means for opening said gate to release the cooled tube and permit it to roll down the slide, and a striker member in the path of movement of the tube down the slide for imparting a mechanical shock to the cooled tube serving to sever the tube at the said line of weakness therein.

5. Apparatus for forming articles from a glass tube comprising means for supporting the tube horizontally, feed means including a rotating feed shaft for delivering the tube to the support means, means for heating an intermediate portion of the tube in said support means, means for annularly indenting the heated portion of the tube to form a predominant line of weakness therein, a slide for receiving the heated and formed tube from the support means in a position to roll down said slide, means for effecting transfer of the tube from said support means to said slide a gate for temporarily holding the formed tube from rolling down the slide until the heated portion of the tube cools, cam means on said feed shaft for opening said gate to release the cooled tube and permit it to roll down the slide, and a striker member in the path of movement of the tube down the slide for imparting a mechanical shock to the cooled tube serving to sever the tube at the said line of weakness therein.

6. Apparatus for reshaping glass tubes comprising a pair of opposed rollers forming a roller cradle for supporting the glass tube horizontally therein, means for heating a portion of the tube in the cradle, means for reshaping the heated portion of the tube to form an annular line of weakness therein, tube receiving means disposed under the roller cradle, means for separating said rollers to permit the tube to drop therebetween and down onto the said receiving means, and means in cooperative relation to said tube receiving means for imparting a mechanical shock to the tube to sever it at its line of weakness.

7. Apparatus for reshaping glass tubes comprising a pair of opposed rollers forming a roller cradle for supporting the glass tube horizontally therein, a pivotal support for one of said rollers, means for heating a portion of the tube in the cradle, means for reshaping the heated portion of the tube to form an annular line of weakness therein, tube receiving means disposed under the roller cradle, means for pivoting the said pivotal support to separate the roller carried thereby from the other of said rollers to permit the tube to drop therebetween and down onto the said receiving means, and means in cooperative relation to said tube receiving means for imparting a mechanical shock to the tube to sever it at its line of weakness.

8. Apparatus for reshaping glass tubes comprising a pair of opposed rollers forming a roller cradle for supporting the glass tube horizontally therein, one of said rollers being mounted for movement bodily away from the other of said rollers, means adjacent said roller cradle for heating a portion of the tube in the cradle, means movably mounted adjacent said roller cradle for reshaping the heated portion of the tube, cam means for actuating said reshaping means to move it toward and away from a tube in said roller cradle, tube receiving means disposed under the roller cradle, cam means for moving said one roller away from the other of said rollers to permit the tube to drop therebetween and down onto the said receiving means, and means for effecting operation of the two aforesaid cam means in proper time relation.

9. Apparatus for reshaping glass tubes comprising a pair of opposed rollers forming a roller cradle for supporting the glass tube horizontally therein, a pivotal support for one of said rollers to permit bodily movement of said roller relative to the other of said rollers, resilient means for maintaining the said one roller in its normal tube supporting position, means for heating a portion of the tube in the cradle, means movably mounted adjacent said roller cradle for reshaping the heated portion of the tube, cam means for actuating said reshaping means to move it toward and away from a tube in said roller cradle, tube receiving means disposed under the roller cradle, cam means for pivoting the said pivotal support to move the roller carried thereby away from the other of said rollers and permit the tube to drop between said rollers and down onto the said receiving means, and means for effecting operation of the two aforesaid cam means in proper time relation.

10. In apparatus of the class described, the combination of means for supporting and rotating a glass tube, means for heating the midsection of the tube to soften it, means for stretching the tube on its support to a predetermined length, a forming roller mounted adjacent said tube support means and movable into engagement with the heated section of said tube to form a neck portion of reduced diameter, said roller having a sharp ridge around its periphery to form a sharp peripheral indentation at the center of the said neck portion of the tube, means for releasing the tube from its support means, retaining means for receiving the tube from said support means and for supporting the tube while its heated section cools, means for subsequently imparting a mechanical shock to the cooled tube to sever it at its peripheral indentation, and means for effecting delivery of the tube from said retaining means to the last named means.

11. Apparatus for reshaping glass tubes comprising means for supporting and rotating a glass tube, a pair of end stops contiguous with said support means and between which the tube is longitudinally disposed when positioned on the support means, said end stops being spaced apart a distance which is slightly greater than the length of the said tube, means arranged in operative relation to said rolls to heat the tube intermediate its ends, spaced members adapted to engage and draw apart sections of said tube on opposite sides of the heated portion thereof, one of said members being constructed and arranged to exert a greater pull than the other, a forming roller located in the space between said members and adapted to engage the heated portion of the tube to reshape it, and means for moving into engagement with said tube first the member exerting the greater pull and then the said other member and finally the said forming roller.

ALFRED T. GASKILL.
CHARLES E. BOCK.

REFERENCES CITED

The following references are of record in the file of this patent:

UNITED STATES PATENTS

| Number | Name | Date |
| --- | --- | --- |
| 1,208,978 | Kadow | Dec. 19, 1916 |
| 1,455,056 | Koenig | May 15, 1923 |
| 1,489,836 | King | Apr. 8, 1924 |
| 1,508,358 | Brown | Sept. 9, 1924 |
| 1,631,674 | Favre | June 7, 1927 |
| 1,688,190 | Koenig | Oct. 16, 1928 |
| 1,914,205 | Hooper et al. | June 13, 1933 |
| 2,058,812 | Meyer | Oct. 27, 1936 |
| 2,059,474 | Meyer | Nov. 3, 1936 |
| 2,226,303 | Dichter | Dec. 24, 1940 |
| 2,291,451 | Craig et al. | July 28, 1942 |
| 2,310,469 | Snyder | Feb. 9, 1943 |

FOREIGN PATENTS

| Number | Country | Date |
| --- | --- | --- |
| 117,427 | Australia | Sept. 2, 1943 |
| 131,532 | Great Britain | Aug. 28, 1919 |
| 245,120 | Great Britain | Sept. 9, 1926 |
| 271,972 | Great Britain | June 9, 1927 |
| 725,820 | France | Jan. 14, 1931 |